United States Patent Office 2,748,145
Patented May 29, 1956

2,748,145
CHALCOGENOUS COMPLEXES

Earl L. Muetterties, Hockessin, Del., assignor to E. I. du Pont de Nemours and Company, Wilmington, Del., a corporation of Delaware No Drawing. Application July 27, 1953,
Serial No. 370,653

8 Claims. (Cl. 260—329)

This invention relates to new compositions of matter and more specifically to coordination complexes between inorganic and organic compounds.

The formation of stable chemical complexes in which the unit bond is a coordinately shared pair of electrons derived from a donor having a lone pair of valency electrons and an acceptor capable of increasing its valency electrons by two is a well established concept which has proved fundamental to the understanding of certain chemical phenomena. This concept is based largely on the work of G. N. Lewis as outlined in his book "Valence and the Structure of Atoms and Molecules" (The Chemical Catalogue Company, Inc., N. Y., 1923) and as interpreted by N. V. Sidgwick in his book "The Electronic Theory of Valency" (Oxford University Press, London, 1929, see especially page 116).

This invention has an object the provision of a new class of chemical complexes containing a donor:acceptor bond between an organic compound and an inorganic compound. A further object is the provision of new compositions of matter useful as catalysts for promoting chemical reactions. Other objects will appear hereinafter.

These objects are accomplished by the present invention of addition complexes of phosphorus pentafluoride, $PF_5$, with an organic Lewis base having, as a donor atom, a bivalent chalcogen, of atomic weight less than 33, both valences of said chalcogen being attached only to carbon, the phosphorus pentafluoride and Lewis base being present in the complex in a ratio of positive integers up to one mole of the pentafluoride for each said donor atom in one molecule of the Lewis base. The donor chalcogen of the Lewis bases is capable of furnishing an electron pair to form a coordinate bond with the phosphorus pentafluoride.

The complexes are stable materials which can be isolated and purified and thus have their physical characteristics determined. They show pronounced catalytic activity, especially in promoting polymerization reactions, and their stability and improved ease of handling over uncombined phosphous pentafluoride make them highly useful for this purpose.

In a preferred embodiment of the invention the organic Lewis base, e. g., tetrahydrofuran, is treated directly with phosphorus pentafluoride gas. The $PF_5$ complex separates as a crystalline solid. This solid is purified by distillation under reduced pressure at a temperature above its melting point or by sublimation.

The formation of addition complexes between phosphorus pentafluoride and an organic Lewis base whose donor atom is a chalcogen of atomic weight less than 33 bonded only to polyvalent atoms is a general reaction.

The following examples in which parts are by weight are illustrative of the invention.

Example I

A reaction tube is charged with 2.557 parts (0.021 mole) of diethyl ether and is cooled to about 5° C. Phosphorus pentafluoride is passed directly into the ether until no further absorption takes place as evidenced by fuming at exit tube. The tube and reaction mixture are weighed. There is a weight increase of 2.612 parts corresponding to 0.0207 mole of phosphorus pentafluoride. The mole fraction of phosphorus pentafluoride to diethyl either is 0.985.

Example II

A 7.501 part (0.104 mole) sample of tetrahydrofuran is weighed out into a reaction tube. The ether is cooled with an ice-water mixture. Phosphorus pentafluoride is passed directly into the ether until no further takeup of gas takes place. There is a weight increase of 12.952 parts corresponding to 0.103 mole of phosphorus pentafluoride. The mole fraction of phosphorus pentafluoride to tetrahydrofuran is 0.99. A sample of the complex is fractionally distilled in a micro-still. The main fraction boils at 116–118° C. (0.15 mm.). This fraction is a white solid which melts at 54–55° C. Analysis yields the following results: C, 24.49%; H, 5.62%; theoretical for $F_5P.O(CH_2)_4$, C, 24.25%; H, 4.08%.

Example III

A 4.40 part (0.05 mole) sample of ethyl acetate is weighed out in a tared test tube fitted with a long gas entry tube. Phosphorus pentafluoride is passed into the ester until no further absorption occurs. The weight increase is 6.11 parts corresponding to 0.0485 mole of phosphorus pentafluoride. The mole fraction of the complex, phosphorus pentafluoride to ethyl acetate, is 0.97. This indicates a one to one complex. The product is sublimed at 40–50° C. and 0.3 mm. The sublimate is a white crystalline solid which is highly hygroscopic.

Example IV

A sample of pentamethylene oxide (purified by (1) reflux over NaOH followed by distillation, (2) hydrogenation with palladium-on-charcoal catalyst to remove any dihydropyran present, (3) reflux over $LiAlH_4$ and distillation therefrom immediately prior to use) is cooled in an ice bath under an atmosphere of nitrogen, and $PF_5$ is passed in until a white solid is formed. A slight excess of pentamethylene oxide is then removed from this product by evacuation at room temperature under a pressure of 0.05 mm. The resulting white crystalline complex melts in a sealed capillary tube at 45–46° C. This product is extremely hygroscopic.

A one mole per cent solution of the above $PF_5$/pentamethylene oxide complex in tetrahydrofuran at 10° C. gives a high yield of tetrahydrofuran polymer after 18 hours.

Example V

Phosphorus pentafluoride (0.0216 mole) is passed into liquid tetramethylene sulfide (0.015 mole) at −80° C. A white solid is formed. The mixture is warmed to 0° C., and about 0.0072 mole of unreacted gaseous phosphorus pentafluoride and about 0.0055 mole of unreacted liquid tetramethylene sulfide are separated from the solid $PF_5$/tetramethylene sulfide complex. The amounts of $PF_5$ and tetramethylene sulfide remaining in the form of the complex represents substantially a 1:1 molar ratio. When warmed to room temperature, the complex melts to a clear liquid and resolidifies when cooled again to 0° C. When heated at 100° C., the molten complex rapidly dissociates with evolution of gaseous phosphorus pentafluoride.

Example VI

Phosphorus pentafluoride gas is passed into 2-methyltetrahydrofuran until no more gas is absorbed. The resulting liquid complex is purified by distillation at 70 to 80° C. and 35mm. pressure. There is some evidence of dissociation of the complex at this distillation temperature. Titration of the distillate showed approximately a 1:1 molar ratio of $PF_5$ to 2-methyltetrahydrofuran. This $PF_5$/2-methyltetrahydrofuran complex at 0.5 mole per cent concentration in tetrahydrofuran gives a high yield of tetrahydrofuran polymer after 18 hours at 30° C.

*Example VII*

Phosphorus pentafluoride is passed into acetone. There is extensive absorption of the gas, and the $PF_5$/acetone complex is formed.

*Example VIII*

Phosphorus pentafluoride is passed into acetaldehyde. There was an extensive absorption of the gas, and the $PF_5$/acetaldehyde complex is formed.

*Example IX*

Phosphorus pentafluoride is passed into acetic anhydride. There is an extensive absorption of the gas, and the $PF_5$/acetic anhydride complex is formed.

*Example X*

Phosphorus pentafluoride is passed into 2,2,5,5-tetramethyl-1,3-dioxolane-4-one. There is extensive absorption of the gas, and the $PF_5$/2,2,5,5-tetramethyl-1,3-dioxolane-4-one complex is formed.

*Example XI*

Phosphorus pentafluoride is passed into dioxane. There is extensive absorption of the gas, and the $PF_5$/dioxane complex is formed.

*Example XII*

Phosphorus pentafluoride is passed into 1,3-dioxolane. There is extensive absorption of the gas, and the $PF_5$/1,3-dioxolane complex is formed.

*Example XIII*

Phosphorus pentafluoride is passed into dihydropyran. There is extensive absorption of the gas, and the $PF_5$/dihydropyran complex is formed.

*Example XIV*

Phosphorus pentafluoride is passed into 2,5-dimethoxytetrahydrofuran. There is extensive absorption of the gas, and the $PF_5$/2,5-dimethoxytetrahydrofuran complex is formed.

The organic Lewis bases which form with phosphorus pentafluoride, $PF_5$, the complexes of the present invention have as donor atoms at least one bivalent chalcogen of atomic weight less than 33, each valence of the chalcogen being bonded to carbon. Thus the invention is generic to the complexes, with phosphorus pentafluoride of esters, ethers, carboxylic acid anhydrides RCO—O—COR' where R and R' are the same or different organic radicals, ketones, aldehydes, sulfides, thioaldehydes and thioketones.

The phosphorus pentafluoride complexes of the present invention are highly useful as catalysts in the alkylation, e. g., with ethylene, of aromatics, e. g., benzene, and also as catalysts for the polymerization of vinyl compounds, e. g., vinyl isobutyl ether. The phosphorus pentafluoride/tetrahydrofuran addition complex is an excellent catalyst for the polymerization of tetrahydrofuran to solid polymers. The complexes of phosphorus pentafluoride with 2-methyltetrahydrofuran and tetrahydropyran are similarly useful in catalyzing the polymerization of tetrahydrofuran.

The term "Lewis base" is one employed in the field of organic chemistry. See, for example, Wheland, "Advanced Organic Chemistry" (second edition, Wiley, 1949), pages 81, 83.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An addition complex of phosphorus pentafluoride with an organic Lewis base having a donor atom which is a bivalent chalcogen of atomic weight less than 33 which chalcogen has each of its valences bonded to carbon, said phosphorus pentafluoride and Lewis base being present in said complex in a molar ratio of positive integers up to 1 mole of the pentafluoride for each said donor atom in one molecule of the Lewis base.

2. An addition complex of phosphorus pentafluoride with an organic Lewis base having a donor atom which is a bivalent chalcogen of atomic weight less than 33 which chalcogen has each of its valences bonded to carbon.

3. An addition complex of phosphorus pentafluoride with an organic Lewis base having a donor atom which is a bivalent chalcogen of atomic weight less than 33 which chalcogen has each of its valences bonded to the same carbon.

4. An addition complex of phosphorus pentafluoride with an organic Lewis base having, as the donor atom, an oxygen atom which has each of its valences bonded to carbon.

5. An addition complex of phosphorus pentafluoride with an organic Lewis base having, as the donor atom, an oxygen atom which has each of its valences bonded to the same carbon.

6. An addition complex of phosphorus pentafluoride with tetrahydrofuran.

7. An addition complex of phosphorus pentafluoride with tetramethylene sulfide.

8. An addition complex of phosphorus pentafluoride with ethyl acetate.

References Cited in the file of this patent

UNITED STATES PATENTS 2,435,412   Soday _____ Feb. 3, 1948

FOREIGN PATENTS 486,563   Great Britain _____ June 7, 1938

OTHER REFERENCES

Sidgwick: The Chemical Elements and Their Compounds (Oxford, 1950).